United States Patent
Razaghi et al.

(10) Patent No.: US 9,699,677 B2
(45) Date of Patent: Jul. 4, 2017

(54) APPARATUS AND METHODS FOR PERFORMING OUTER LOOP POWER CONTROL FOR FRAME EARLY TERMINATION IN WIRELESS COMMUNICATIONS

(71) Applicant: QUALCOMM Incorporated, San Diego, CA (US)

(72) Inventors: Peyman Razaghi, San Diego, CA (US); Sony John Akkarakaran, Poway, CA (US); Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 14/533,401

(22) Filed: Nov. 5, 2014

(65) Prior Publication Data

US 2015/0131466 A1    May 14, 2015

Related U.S. Application Data

(60) Provisional application No. 61/902,123, filed on Nov. 8, 2013.

(51) Int. Cl.
*H04W 24/08* (2009.01)
*H04W 52/12* (2009.01)
*H04W 52/20* (2009.01)
*H04W 52/24* (2009.01)

(52) U.S. Cl.
CPC ............ *H04W 24/08* (2013.01); *H04W 52/12* (2013.01); *H04W 52/20* (2013.01); *H04W 52/241* (2013.01)

(58) Field of Classification Search
CPC ... H04L 1/0026; H04L 1/1812; H04L 1/1816; H04W 24/08; H04W 52/10; H04W 52/12; H04W 52/125; H04W 52/14; H04W 52/143; H04W 52/146; H04W 52/20; H04W 52/223; H04W 25/225; H04W 52/24; H04W 52/241
See application file for complete search history.

(56) References Cited

U.S. PATENT DOCUMENTS

2005/0085255 A1* 4/2005 Andersson ............ H04W 52/12
 455/522
2008/0301515 A1* 12/2008 Sagfors ................. H04L 1/1812
 714/748

(Continued)

FOREIGN PATENT DOCUMENTS

EP  1494370 A1  1/2005
WO  WO-2009068078 A1  6/2009

OTHER PUBLICATIONS

International Search Report and Written Opinion—PCT/US2014/064344—ISA/EPO—Jul. 3, 2015.

(Continued)

*Primary Examiner* — Khoa Huynh
(74) *Attorney, Agent, or Firm* — Loza & Loza LLP

(57) ABSTRACT

Aspects of the present disclosures are directed to outer loop power control (OLPC) mechanisms that can achieve or realize the desired block error rate (BLER) performance in a wireless network that supports frame early termination (FET) utilizing multiple decoding attempts during the same transmit time interval.

26 Claims, 12 Drawing Sheets

(56) References Cited

U.S. PATENT DOCUMENTS

| | | | |
|---|---|---|---|
| 2010/0056197 A1* | 3/2010 | Attar | H04L 1/0026 455/522 |
| 2011/0299442 A1* | 12/2011 | Nammi | H04L 1/1829 370/310 |
| 2013/0250785 A1* | 9/2013 | Mujtaba | H04L 1/0045 370/252 |

OTHER PUBLICATIONS

Partial International Search Report—PCT/US2014/064344—ISA/EPO—Jan. 23, 2015.

* cited by examiner

APPARATUS AND METHODS FOR PERFORMING OUTER LOOP POWER CONTROL FOR FRAME EARLY TERMINATION IN WIRELESS COMMUNICATIONS

PRIORITY CLAIM

This application claims priority to and the benefit of provisional patent application No. 61/902,123 filed in the United States Patent and Trademark Office on 8 Nov. 2013, the entire content of which is incorporated herein by reference.

TECHNICAL FIELD

Aspects of the present disclosure relate generally to wireless communication systems, and more particularly, to power control mechanisms in wireless communications.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband Code-Division Multiple-Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

In a UMTS network that supports frame early termination (FET), a data frame may be decoded in one or more decoding attempts during a transmit time interval (TTI) at the receiver side, and the receiver signals the transmitter to terminate transmission through an acknowledgement or feedback channel if decoding is successful at any of the decoding attempts. The decoding attempts can be spread over the entire TTI so as to increase the chance of frame early termination.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosures are directed to outer loop power control (OLPC) mechanisms that can achieve or realize the desired block error rate (BLER) performance in a wireless network that supports frame early termination (FET) utilizing multiple decoding attempts during the same transmit time interval.

In one aspect, the disclosure provides a method for decoding a data frame in wireless communication. A receiver receives a data frame from a transmitter. For example, the data frame may be received by a base station. The receiver decodes the data frame in a plurality of decoding attempts during a same transmit time interval (TTI). The receiver further performs an outer loop power control (OLPC) procedure configured to determine a plurality of signal-to-interference ratio (SIR) set-points. Each of the plurality of SIR set-points corresponds to a block error rate (BLER) target of a corresponding one of the decoding attempts. The receiver further selects a maximum SIR set-point for an inner loop power control (ILPC) procedure, from the plurality of SIR set-points.

Another aspect of the disclosure provides a method for decoding a data frame in wireless communication. A receiver receives a data frame from a transmitter. For example, the receiver may be a base station. The receiver decodes the data frame in a plurality of decoding attempts during a same transmit time interval (TTI), to generate a plurality of decoding outcomes. The receiver further performs an outer loop power control (OLPC) procedure configured to adjust a single signal-to-interference ratio (SIR) set-point for the data frame, using a plurality of SIR adjustment step sizes based on the decoding outcomes. The receiver further performs an inner loop power control (ILPC) procedure, utilizing the single SIR set-point.

Another aspect of the disclosure provides an apparatus for wireless communication. The apparatus includes a transceiver configured to receive a data frame from a transmitter, a computer-readable medium including a power control code, and at least one processor coupled to the transceiver and configured by the power control code. The at least one processor includes a frame decoding block, an outer loop power control (OLPC) block, and an inner loop power control (ILPC) block. The frame decoding block is configured to decode the data frame in a plurality of decoding attempts during a same transmit time interval (TTI). The OLPC block is configured to perform an OLPC procedure to determine a plurality of signal-to-interference ratio (SIR) set-points, wherein each of the plurality of SIR set-points corresponds to a block error rate (BLER) target of a corresponding one of the decoding attempts. The ILPC block is configured to select a maximum SIR set-point for an ILPC procedure, from the plurality of SIR set-points.

Another aspect of the disclosure provides an apparatus for wireless communication. The apparatus includes a transceiver configured to receive a data frame from a transmitter, a computer-readable medium including a power control code, and at least one processor coupled to the transceiver and configured by the power control code. The at least one processor includes a frame decoding block, an outer loop power control (OLPC) block, and an inner loop power control (ILPC) block. The frame decoding block is configured to decode the data frame in a plurality of decoding attempts during a same transmit time interval (TTI), to generate a plurality of decoding outcomes. The OLPC block is configured to perform an OLPC procedure to adjust a single signal-to-interference ratio (SIR) set-point for the data frame, using a plurality of SIR adjustment step sizes based on the decoding outcomes. The ILPC block is configured to perform an ILPC procedure, utilizing the single SIR set-point.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
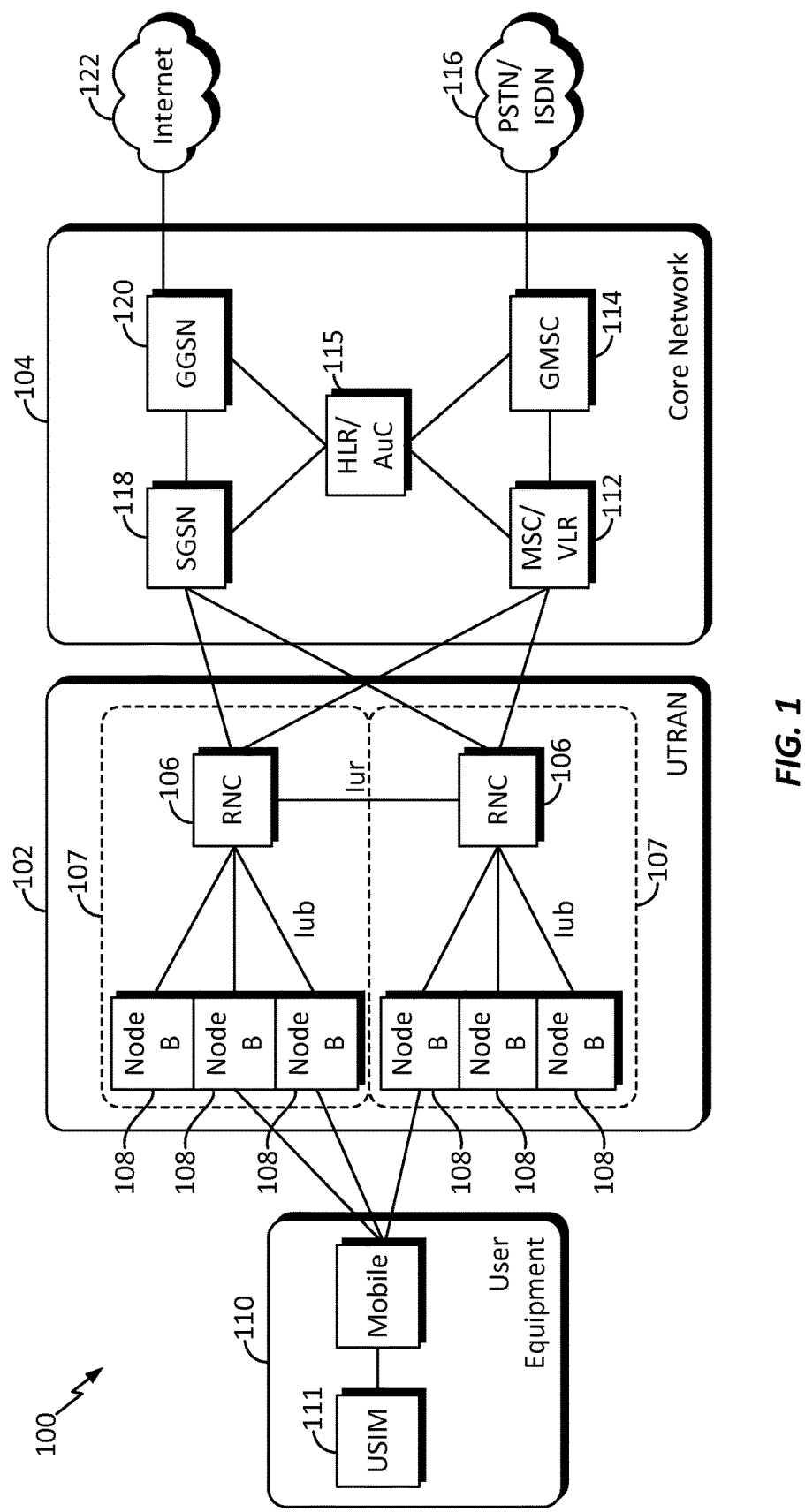
FIG. 1 is a block diagram illustrating an example of a telecommunications system according to aspects of the disclosure.

Aspects of the present disclosures are directed to outer loop power control (OLPC) mechanisms that can achieve or realize the desired block error rate (BLER) performance in a UMTS network that supports frame early termination (FET) utilizing multiple decoding attempts during the same TTI. The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a UMTS system 100. A UMTS network includes three interacting domains: a core network 104, a radio access network (RAN) (e.g., the UMTS Terrestrial Radio Access Network (UTRAN) 102), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a smart watch, an Internet of Things (IoT) device, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 110 may further include a universal subscriber identity module (USIM) 111, which contains a user's subscription information to a network. For illustrative purposes, one UE 110 is shown in communication with a number of the Node Bs 108. The downlink (DL), also called the forward link, refers to the communication link from a Node B 108 to a UE 110 and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC may be shared by both of the circuit-switched and packet-switched domains.

In the illustrated example, the core network 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

In some aspects of the disclosure, the UTRAN 102 may support a high speed packet access (HSPA) air interface. HSPA includes a series of enhancements to the 3G/W-CDMA air interface between the UE 110 and the UTRAN 102, facilitating greater throughput and reduced latency for users. Among other modifications over prior standards, HSPA utilizes hybrid automatic repeat request (HARQ), shared channel transmission, frame early termination (FET), and adaptive modulation and coding. The standards that define HSPA include HSDPA (high speed downlink packet access) and HSUPA (high speed uplink packet access, also referred to as enhanced uplink or EUL).

For example, in Release 5 of the 3GPP family of standards, HSDPA was introduced. HSDPA utilizes as its transport channel the high-speed downlink shared channel (HS-DSCH), which may be shared by several UEs. The HS-DSCH is implemented by three physical channels: the high-speed physical downlink shared channel (HS-PDSCH), the high-speed shared control channel (HS-SCCH), and the high-speed dedicated physical control channel (HS-DPCCH).

The HS-SCCH is a physical channel that may be utilized to carry downlink control information related to the transmission of HS-DSCH. Here, the HS-DSCH may be associated with one or more HS-SCCH. The UE may continuously monitor the HS-SCCH to determine when to read its data from the HS-DSCH and to determine the modulation scheme used on the assigned physical channel.

The HS-PDSCH is a physical channel that may be shared by several UEs and may carry downlink data for the high-speed downlink. The HS-PDSCH may support quadrature phase shift keying (QPSK), 16-quadrature amplitude modulation (16-QAM), and multi-code transmission.

The HS-DPCCH is an uplink physical channel that may carry feedback from the UE to assist the Node B in its scheduling algorithm. The feedback may include a channel quality indicator (CQI) and a positive or negative acknowledgement (ACK/NAK) of a previous HS-DSCH transmission.

One difference on the downlink between Release-5 HSDPA and the previously standardized circuit-switched air-interface is the absence of soft handover in HSDPA. This means that HSDPA channels are transmitted to the UE from a single cell called the HSDPA serving cell. As the user moves, or as one cell becomes preferable to another, the HSDPA serving cell may change. Still, the UE may be in soft handover on the associated DPCH, receiving the same information from plural cells.

In Release 5 HSDPA, at any instance a UE 210 has one serving cell: the strongest cell in the active set as according to the UE measurements of $E_c/I_0$. According to mobility procedures defined in Release 5 of 3GPP TS 25.331, the radio resource control (RRC) signaling messages for changing the HSPDA serving cell are transmitted from the current HSDPA serving cell (i.e., the source cell) and not the cell that the UE reports as being the stronger cell (i.e., the target cell).

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. In the present disclosure, the DPCCH may be referred to as a control channel (e.g., a primary control channel) or a pilot channel (e.g., a primary pilot channel) in accordance with whether reference is being made to the channel's control aspects or its pilot aspects.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

Figure 2:
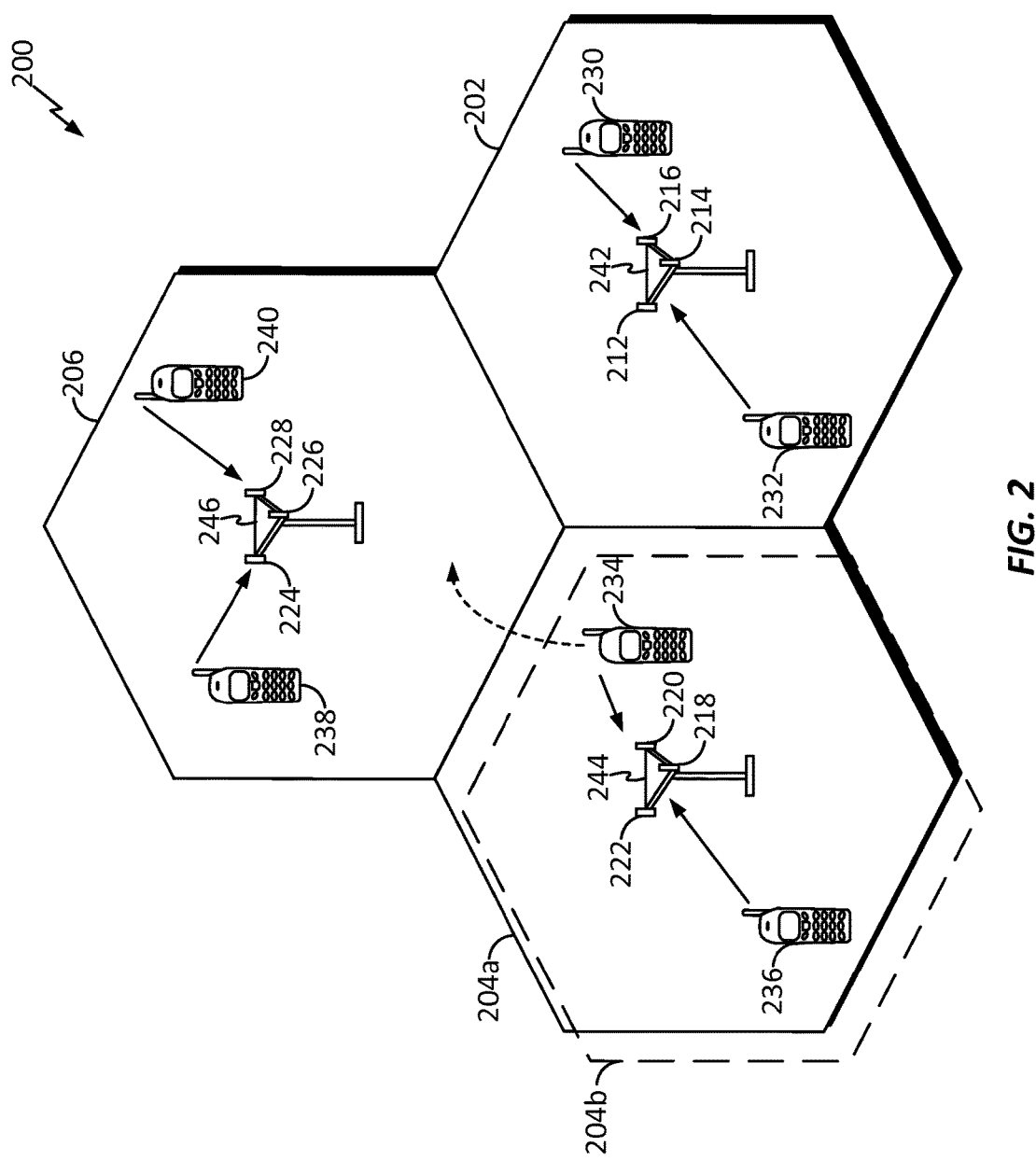
FIG. 2 is a diagram illustrating an example of an access network according to aspects of the disclosure.

The UTRAN 102 is one example of a RAN that may be utilized in accordance with the present disclosure. Referring to FIG. 2, by way of example and without limitation, a simplified schematic illustration of a RAN 200 in a UTRAN architecture is illustrated. The system includes multiple cellular regions (cells), including cells 202, 204, and 206, each of which may include one or more sectors. Cells may be defined geographically (e.g., by coverage area) and/or may be defined in accordance with a frequency, scrambling code, etc. That is, the illustrated geographically-defined cells 202, 204, and 206 may each be further divided into a plurality of cells, e.g., by utilizing different scrambling codes. For example, cell 204a may utilize a first scrambling code, and cell 204b, while in the same geographic region and served by the same Node B 244, may be distinguished by utilizing a second scrambling code.

In a cell that is divided into sectors, the multiple sectors within a cell can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 may each correspond to a different sector. In cell 206, antenna groups 224, 226, and 228 may each correspond to a different sector.

The cells 202, 204, and 206 may include several UEs that may be in communication with one or more sectors of each cell 202, 204, or 206. For example, UEs 230 and 232 may be in communication with Node B 242, UEs 234 and 236 may be in communication with Node B 244, and UEs 238 and 240 may be in communication with Node B 246. Here, each Node B 242, 244, and 246 may be configured to provide an access point to a core network 204 (see FIG. 2) for all the UEs 230, 232, 234, 236, 238, and 240 in the respective cells 202, 204, and 206. Any of the UEs in FIG. 2 may be the same as a UE illustrated in FIGS. 1, 4, and/or 8.

During a call with a source cell, or at any other time, the UE 236 may monitor various parameters of the source cell as well as various parameters of neighboring cells. Further, depending on the quality of these parameters, the UE 236 may maintain communication with one or more of the neighboring cells. During this time, the UE 236 may maintain an Active Set, that is, a list of cells to which the UE 236 is simultaneously connected (i.e., the UTRAN cells that are currently assigning a downlink dedicated physical channel DPCH or fractional downlink dedicated physical channel F-DPCH to the UE 236 may constitute the Active Set).

The UTRAN air interface may be a spread spectrum Direct-Sequence Code Division Multiple Access (DS-CDMA) system, such as one utilizing the W-CDMA standards. The spread spectrum DS-CDMA spreads user data through multiplication by a sequence of pseudorandom bits called chips. The W-CDMA air interface for the UTRAN 102 is based on such DS-CDMA technology and additionally calls for a frequency division duplexing (FDD). FDD uses a different carrier frequency for the uplink (UL) and downlink (DL) between a Node B and a UE. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface or any other suitable air interface.

In a wireless telecommunication system, the communication protocol architecture may take on various forms depending on the particular application. For example, in a 3GPP UMTS system, the signaling protocol stack is divided into a Non-Access Stratum (NAS) and an Access Stratum (AS). The NAS provides the upper layers, for signaling between a UE 110 and a core network 104 (referring to FIG. 1), and may include circuit switched and packet switched protocols. The AS provides the lower layers, for signaling between a UTRAN 102 and a UE 110, and may include a user plane and a control plane. Here, the user plane or data plane carries user traffic, while the control plane carries control information (i.e., signaling).

Figure 3:
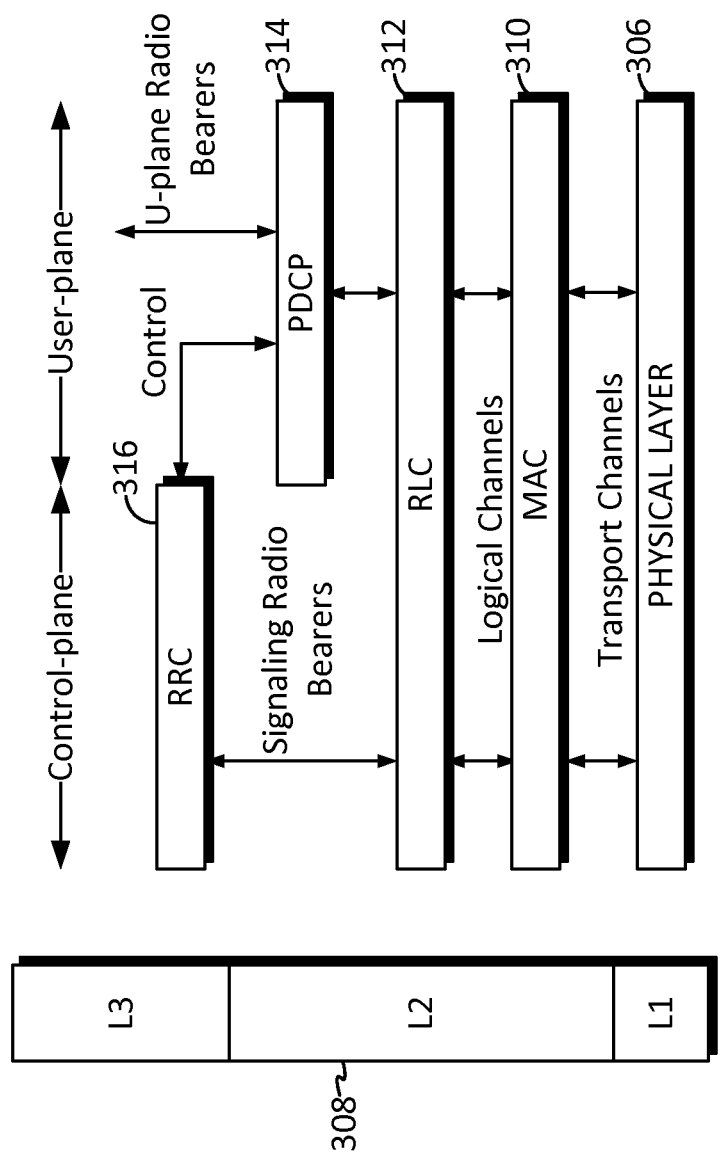
FIG. 3 is a diagram illustrating an example of a radio protocol architecture for the user and control plane according to aspects of the disclosure.

Turning to FIG. 3, the AS is shown with three layers: Layer 1, Layer 2, and Layer 3. Layer 1 is the lowest layer and implements various physical layer signal processing functions. Layer 1 will be referred to herein as the physical layer 306. The data link layer, called Layer 2 308, is above the physical layer 306 and is responsible for the link between a UE and a Node B over the physical layer 306.

At Layer 3, the RRC layer 316 handles the control plane signaling between the UE and the Node B. RRC layer 316 includes a number of functional entities for routing higher layer messages, handling broadcasting and paging functions, establishing and configuring radio bearers, etc.

In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Although not shown, the UE may have several upper layers above the L2 layer 308 including a network layer (e.g., IP layer) that is terminated at a PDN gateway on the network side and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations.

Figure 4:
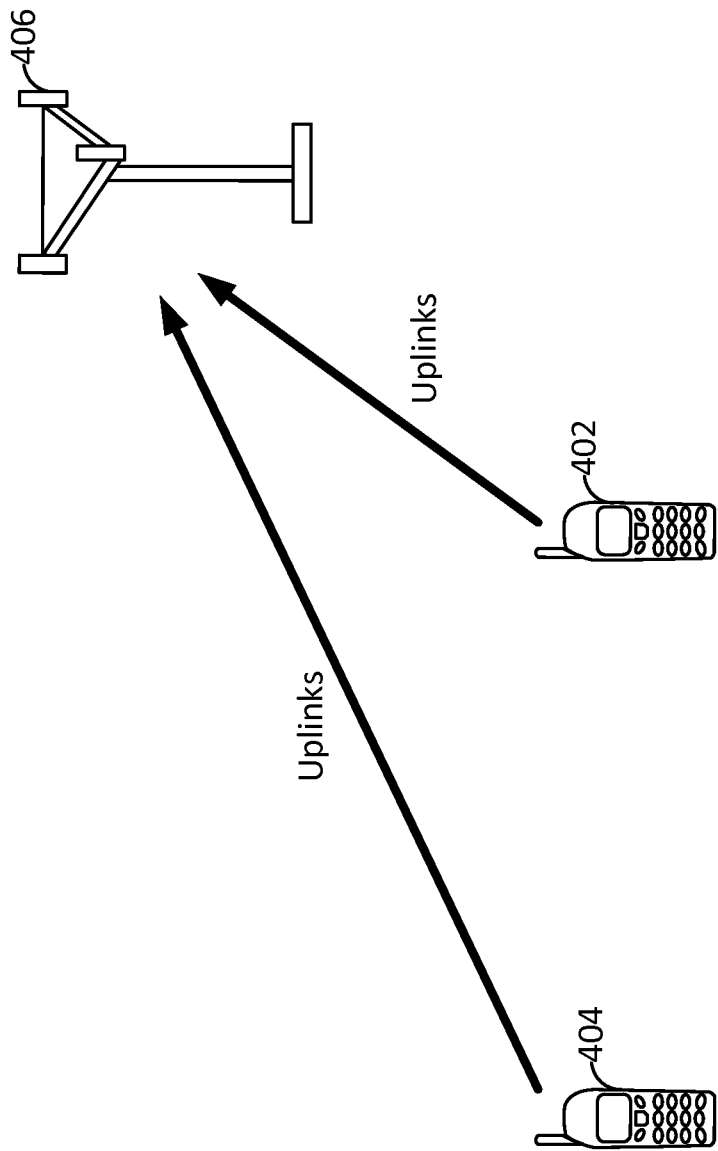
FIG. 4 is a diagram illustrating multiple user equipment in communication with a Node B utilizing a W-CDMA multiple access air interface according to aspects of the disclosure.

In a UMTS network, active power control is utilized to improve reception of transmissions, for example, from UEs to a Node B. FIG. 4 is a diagram illustrating multiple UEs in communication with a Node B utilizing a W-CDMA multiple access air interface. In this example, UEs 402 and 404 simultaneously operate within the same frequency separated only by their spreading codes. Therefore, they are susceptible to interference problems. For example, a single UE 402 transmitting at a very high power can block the Node B 406 from receiving transmissions from other UEs (e.g., UE 404), which may be further away from the Node B 406.

Figure 5:
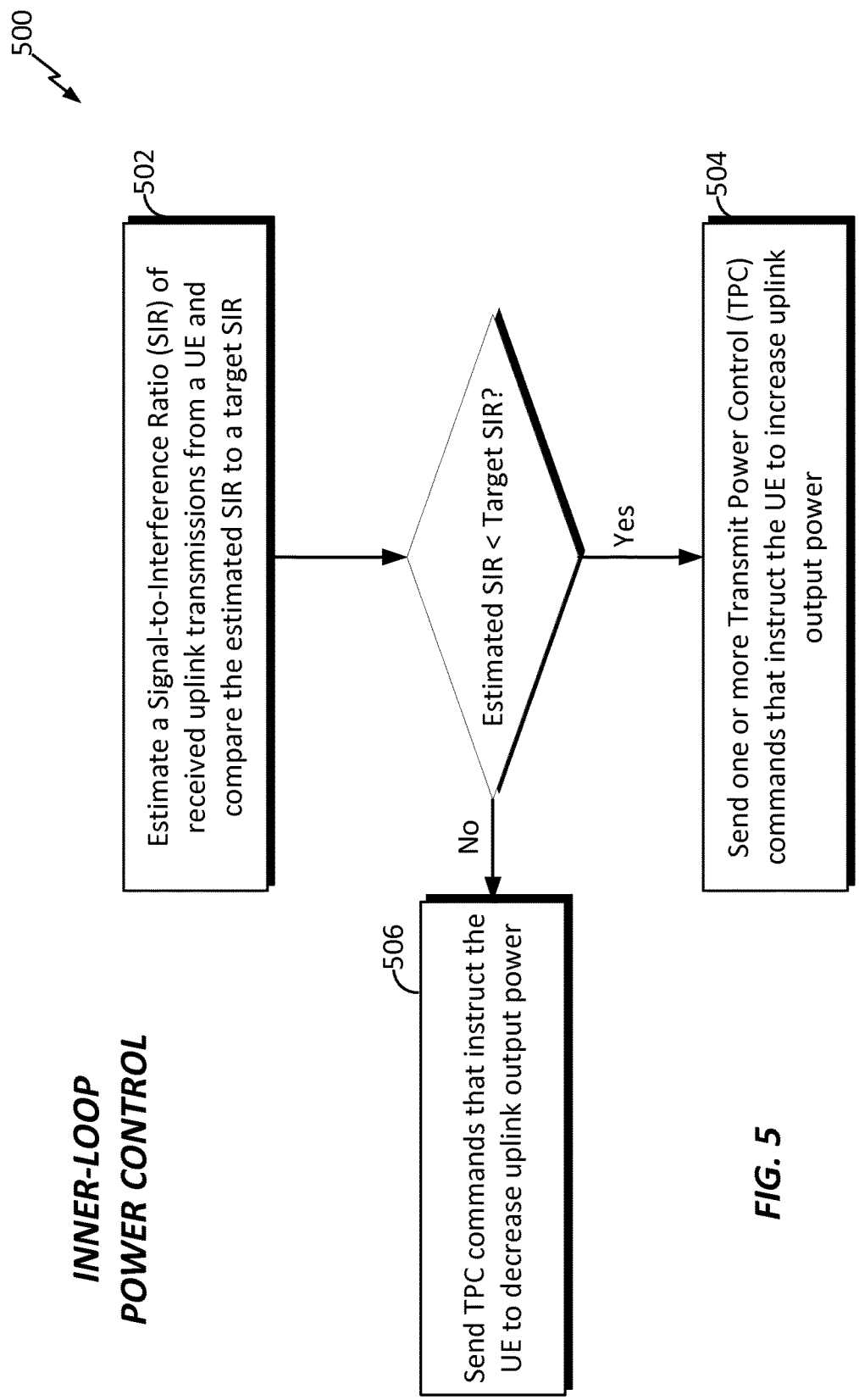
FIG. 5 is a flowchart illustrating an inner loop power control (ILPC) procedure according to aspects of the disclosure.

To address this issue, conventional UMTS systems can implement a fast closed-loop power control procedure, typically referred to as inner loop power control (ILPC). FIG. 5 is a flowchart illustrating an ILPC 500 in accordance with an aspect of the disclosure. The ILPC procedure 500 may be performed by any of the UEs and Node Bs illustrated in FIGS. 1, 2, 4, and/or 8. At block 502, a Node B estimates a signal-to-interference ratio (SIR) of received uplink transmissions from a particular UE and compares the estimated SIR to a target SIR (SIR set-point). Based on this comparison with the target SIR, the Node B can transmit feedback to the UE instructing the UE to increase or decrease its transmission power. For example, at block 504, if the estimated SIR is less than the target SIR, the Node B can send one or more Transmit Power Control (TPC) commands that instruct the UE to increase its uplink output power. Otherwise, at block 506, if the estimated SIR is greater than the target SIR, the Node B can send one or more TPC commands that instruct the UE to decrease its uplink output power. If the estimated SIR is equal to or within a predetermined range of the target SIR, the Node B may not send TPC commands to the UE. The TPC transmissions can occur once per slot, resulting in 1500 transmissions per second. For additional control, as described further below, the target SIR can be varied by utilizing outer loop power control based on whether or not the data transmissions meet a desired Block Error Rate (BLER) target.

In ILPC, the transmit power of the downlink channels is determined by the network. For example, the power control step size can take four values: 0.5, 1, 1.5 or 2 Decibel (dB). The UE generates TPC commands to control the network transmit power and send them to the UTRAN. Upon receiving the TPC commands, the UTRAN adjusts its downlink power accordingly.

In addition to the ILPC, a UMTS network may additionally utilize outer loop power control (OLPC) to keep the quality of communication at the desired level by setting the target SIR (SIR set-point) for the ILPC. In a UMTS network, OLPC may be used in both uplink and downlink because fast ILPC is used in both uplink and downlink communications. In the following illustrative example, some aspects of uplink OLPC are described. However, similar features can be used in both uplink and downlink OLPC. The uplink OLPC is located in an RNC, and the downlink OLPC is located in the UE.

Figure 6:
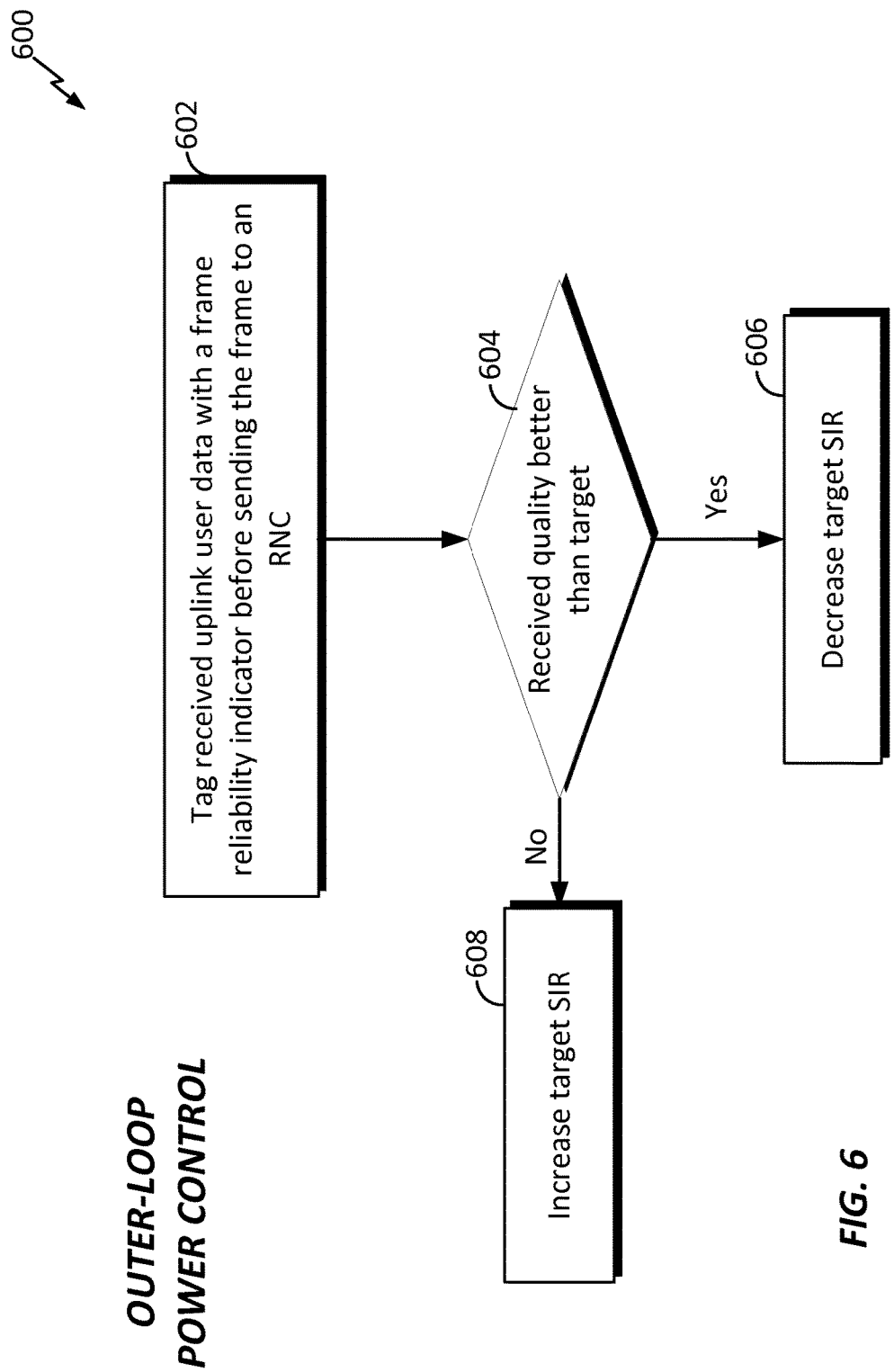
FIG. 6 is a flowchart illustrating an outer loop power control (OLPC) procedure for adjusting the target SIR set point at a Node B according to aspects of the disclosure.

FIG. 6 is a flowchart illustrating an OLPC procedure 600 for adjusting a target SIR set-point at a Node B in accordance with an aspect of the disclosure. The OLPC procedure 600 may be performed by any of the UEs, Node Bs, and/or RNC illustrated in FIGS. 1, 2, 4, and/or 8. The target SIR set-point is adjusted based on the condition of the individual radio link and desired uplink quality. Adjustment of the target SIR set-point by utilizing the OLPC procedure 600, causes a UE to change its transmission power to achieve a certain uplink quality such as a block error rate (BLER) target. At block 602, the OLPC procedure 600 can be implemented by having a Node B tag received uplink user data with a frame reliability indicator before sending the frame to an RNC. In one particular example, the UE may be the UE 110, the Node B may be the Node B 108, and the RNC may be the RNC 106. In one aspect of the disclosure, the frame reliability indicator may be the result of a CRC check of the received user data.

If the RNC determines that the quality of transmissions from the UE is changing, the RNC may command the Node B to correspondingly alter its SIR target. For example, transmission quality may be based on the BLER of the transmission. At decision block 604, if it is determined that the received uplink quality is better than the desired quality (e.g., BLER of the transmission is better than a desired target BLER), the OLPC procedure 600 proceeds to block 606; otherwise, the OLPC procedure 600 proceeds to block 608. At block 606, the RNC may command the Node B to decrease the target SIR. At block 608, the RNC may command the Node B to increase the target SIR. Then the ILPC (e.g., ILPC procedure 500) will cause the UE to increase or decrease its transmission power to meet the new target SIR. Therefore, the BLER of the transmission will meet the desired target BLER.

If a receiver supports frame early termination (FET), multiple decoding attempts of a transmitted frame are performed at the receiver side, and the receiver signals termination of transmission through an acknowledgement or feedback channel if decoding is successful at any of the decoding attempts. In various aspects of the disclosure, the receiver may be any of the UEs or Node Bs illustrated in FIGS. 1, 2, 4, and/or 8. Utilizing FET allows the sender to terminate the transmission early (e.g., before the end of the TTI), thus reducing interference in the system leading to savings of radio resources and reducing modem power consumption. Multiple decoding attempts (e.g., 2 or more) can be spread over an entire TTI so as to increase the chance of frame early termination.

Frame Early Termination

Figure 7:
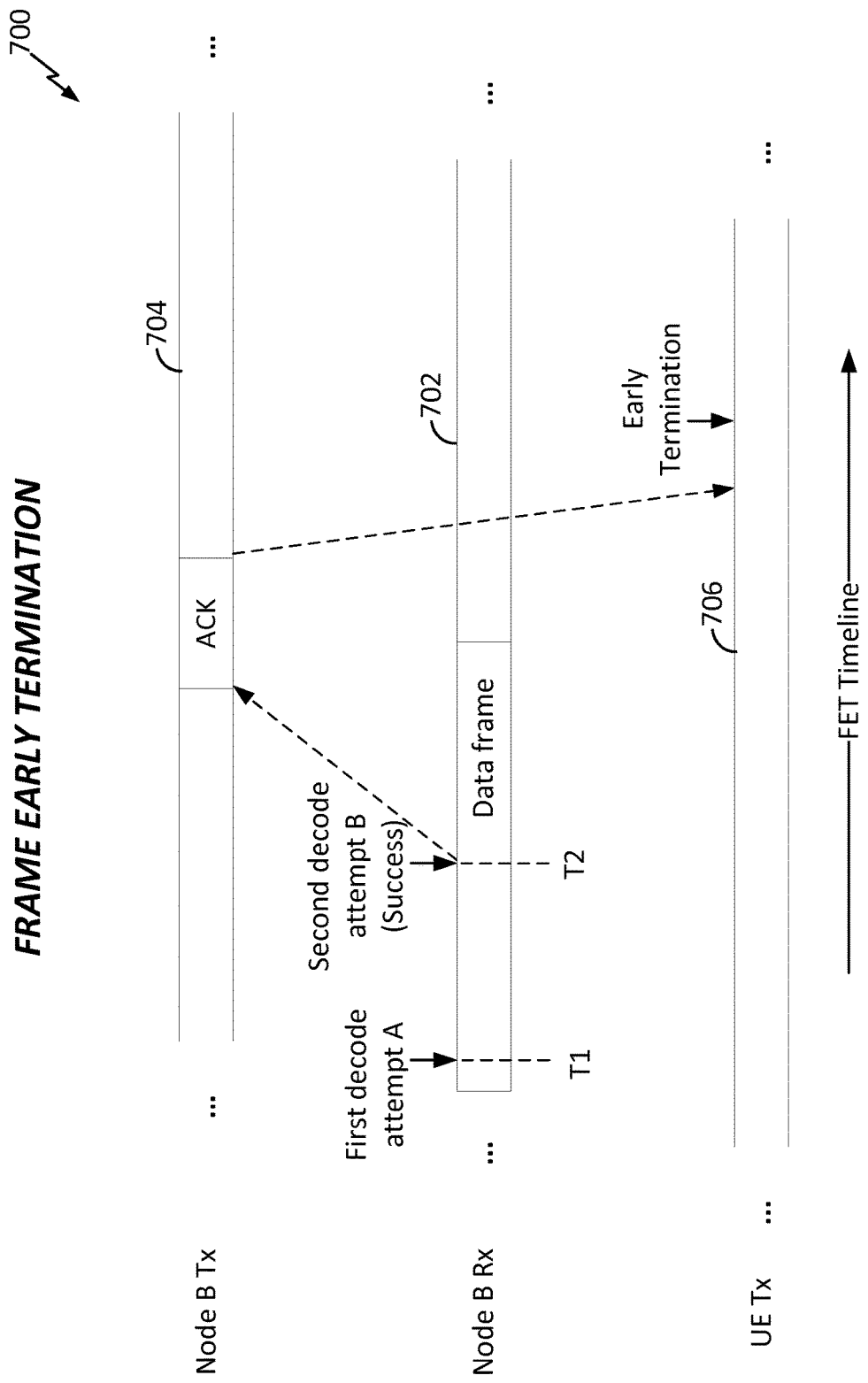
FIG. 7 is a diagram illustrating an uplink frame early termination (FET) procedure using multiple decoding attempts during a transmit time interval (TTI) according to aspects of the disclosure.

FIG. 7 is a diagram illustrating an uplink FET procedure 700 utilizing multiple decoding attempts during a same TTI in accordance with an aspect of the disclosure. The uplink FET procedure 700 may be performed by any of the UEs and Node Bs illustrated in FIGS. 1, 2, 4, and/or 8. In this illustrative example, two decoding attempts are considered during one TTI. In other examples, more than two decoding attempts during the same TTI may be performed. The TTI may be 10 milliseconds (ms) TTI, 20 ms TTI, 40 ms TTI, or 80 ms TTI. In one example, a Node B may receive a data frame from a UE in a Dedicated Physical Data Channel (DPDCH) 702. The Node B performs a first decoding attempt A at a first time point T1, and a second decoding attempt B at a second time point T2. In some examples, the decoding may be attempted at every predetermined number of slots (e.g., 3 slots) or certain time intervals (e.g., 10 ms). The receiver attempts to decode the data frame at the first attempt A, and if not successful, will attempt to decode the frame again at the second attempt B. If second decoding attempt is successful, the Node B may send an ACK (acknowledging successful frame decoding) to the UE using, for example, a downlink Dedicated Physical Control Channel (DPCCH) 704. In response to the ACK from the Node B, the UE may perform early termination to its uplink 760 (e.g., DPCCH/DPDCH). For example, the UE may turn off its receiver and/or transmitter during the rest of the TTI, and the Node B may stop transmitting to the UE. Similar FET procedure may be performed in the downlink. In downlink FET procedure, a UE stops receiving data frames after successful early frame decoding.

It is useful in some scenarios to set a BLER target at earlier decoding attempts using an OLPC procedure (e.g., OLPC procedure 600). However, a problem may arise if the BLER target set in the earlier decoding attempts is higher such that the final BLER achieved does not meet the BLER requirement of the data frame. In an illustrative example below, it is assumed that two decoding attempts (attempt A and attempt B) are performed for a received data frame in the same TTI. As shown in table 1 below, a typical OLPC increases the SIR set-point whenever decoding at the first attempt A fails, and decreases the SIR set-point whenever decoding at the first attempt A succeeds. In effect, the OLPC will ignore the decoding status at the second attempt B. By ignoring the decoding status at the second attempt B (i.e., a final attempt), the typical OLPC would be unable to ensure that the SIR set-point meets the desired BLER target of the data frame.

TABLE 1

| Decoding status at attempt A | Decoding Status at attempt B | Final SIR set-point adjustment |
| --- | --- | --- |
| Fail | Fail | UP |
| Fail | Pass | UP |
| Pass | Pass | Down |

Figure 8:
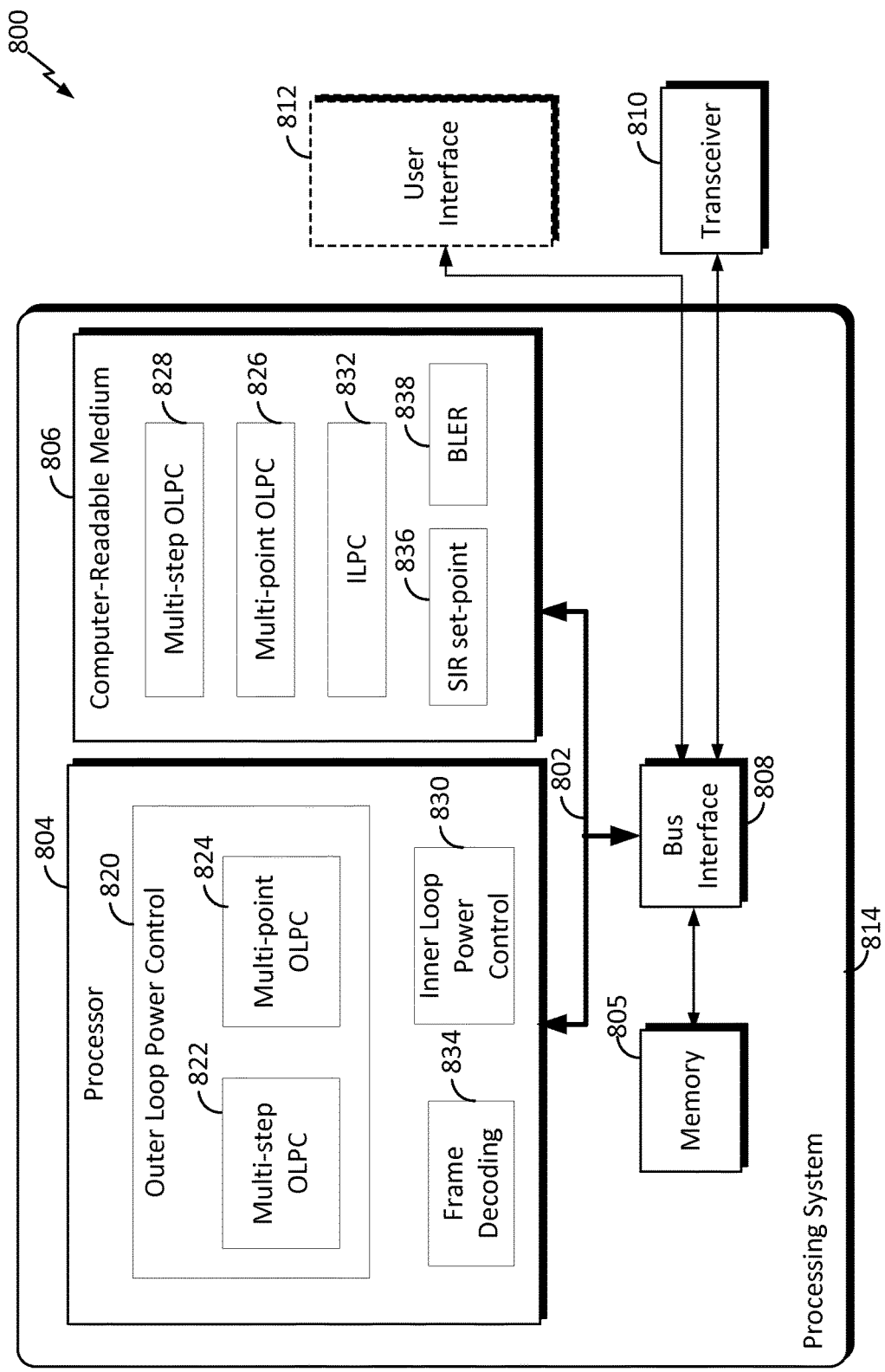
FIG. 8 is a diagram illustrating an example of a hardware implementation for an apparatus employing a processing system according to aspects of the disclosure.

Aspects of the present disclosure provide improved OLPC mechanisms that when a BLER is targeted at earlier decoding attempts, the final achieved BLER can meet the overall desired BLER of the data frame. FIG. 8 is a diagram illustrating an example of a hardware implementation for an apparatus 800 employing a processing system 814. In accordance with various aspects of the disclosure, an element, or any portion of an element, or any combination of elements may be implemented with a processing system 814 that includes one or more processors 804. For example, the apparatus 800 may be a UE, a Node B, and/or an RNC as illustrated in any one or more of FIGS. 1, 2, and/or 4. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 804, as utilized in an apparatus 800, may be used to implement any one or more of the processes described throughout this disclosure and illustrated, for example, in FIGS. 5, 6, and/or 9-12.

In this example, the processing system 814 may be implemented with a bus architecture, represented generally by the bus 802. The bus 802 may include any number of interconnecting buses and bridges depending on the specific application of the processing system 814 and the overall design constraints. The bus 802 links together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a communication interface represented as a transceiver 810. The transceiver 810 provides a means for communicating with various other apparatus over a transmission medium. Depending upon the nature of the apparatus, a user interface 812 (e.g., keypad, display, speaker, microphone, joystick, touchpad, touchscreen, gesture sensor) may also be provided.

The processor 804 is responsible for managing the bus 802 and general processing, including the execution of software or executable instructions stored on the computer-readable medium 806. The software, when executed by the processor 804, causes the processing system 814 to perform the various functions described in FIGS. 5, 6, and/or 9-12 for any particular apparatus. The computer-readable medium 806 may also be used for storing data that is manipulated by the processor 804 when executing software.

In one aspect of the disclosure, the processor 804 may include an outer loop power control (OLPC) block 820 including a MS-OLPC block 822 and a MP-OLPC block 824. The MP-OLPC block 824 can be configured to perform the MP-OLPC procedures and functions illustrated in FIGS. 9-10 when a MP-OLPC code 826 (power control code) is executed by the processor 804. The MS-OLPC block 822 can be configured to perform the MS-OLPC procedures and functions illustrated in FIGS. 11-12 when a MS-OLPC code 828 (power control code) is executed by the processor 804. The processor 804 also includes an inner loop power control (ILPC) block 830 that can be configured to perform various ILPC functions such as those described in relation to FIGS. 5 and/or 9-12 when an ILPC code 832 is executed by the processor 804. The processor 804 may include a frame decoding block 834 that can be utilized to decode a data frame. The computer-readable medium 806 can be used to store various data and variables used in the OLPC and ILPC procedures. For example, one or more SIR set-points 836 and one or more BLERs 838 may be stored in the computer-readable medium 806. The SIR set-points 836 and BLERs 838 may be utilized in the OLPC and/or ILPC procedures illustrated in FIGS. 5, 6, and/or 9-12.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Multi-Point Outer Loop Power Control

Some aspects of the disclosure provide a multi-point outer loop power control (MP-OLPC) algorithm that can facilitate frame early termination (i.e., early successful data frame decoding) using multiple decoding attempts while achieving the desired BLER for the data frame. In the MP-OLPC algorithm, to ensure that the BLER determined by the OLPC procedure can meet the requirement at a particular decoding attempt, a separate OLPC is performed with a target BLER specific to each decoding attempt. For example, for the two decoding attempts A and B shown in FIG. 7, a separate OLPC loop can be performed for each of the decoding attempts A and B.

Figure 9:
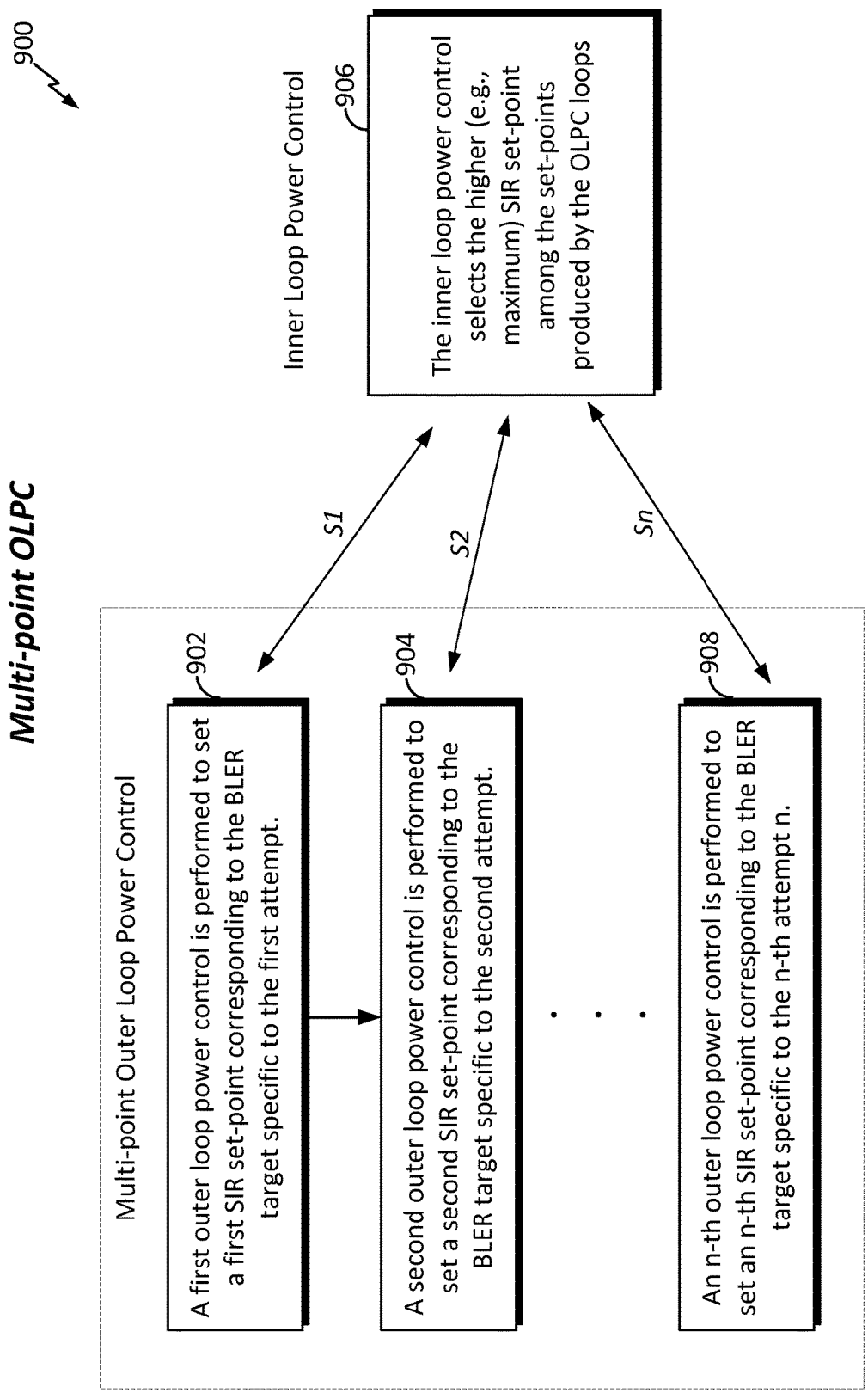
FIG. 9 is a flowchart illustrating a multi-point OLPC algorithm in accordance with aspects of the disclosure.

FIG. 9 is a flowchart illustrating a MP-OLPC algorithm 900 in accordance with aspects of the disclosure. The MP-OLPC algorithm 900 may be performed by any of the UEs, Node Bs, and/or RNCs illustrated in FIGS. 1, 2, 4, and/or 8. At block 902, a first outer loop power control (OLPC) is performed to set a first SIR set-point corresponding to the BLER target specific to a first attempt. At block 904, a second OLPC is performed to determine a second SIR set-point that can meet the desired BLER target for the second attempt. In one example, the OLPC performed in one or more of the attempts may be the same as the OLPC procedure 600 of FIG. 6. At block 906, the inner loop power control (ILPC) procedure will select the higher (e.g., maximum) SIR set-point among the SIR set-points produced by the multiple OLPC loops for each of the decoding attempts. In one example, the ILPC procedure of block 906 may be the same as the ILPC procedure 500 of FIG. 5. In other aspects of the disclosure, the MP-OLPC algorithm 900 may be extended to cases involving 2 or more decoding attempts, and the decoding attempts may have the same or different BLER targets. For example, at block 908, an n-th OLPC is performed to determine an n-th SIR set-point that can meet the desired BLER target for the n-th attempt (n=3 or more).

In this example, BLER1, BLER2 . . . BLERn respectively denote the desired BLER targets at decoding attempts 1, 2 . . . n (n is the number of attempts). That is, BLER1 denotes the BLER target of the first decoding attempt, BLER2 denotes the BLER target of the second decoding attempt, and so on. In the MP-OLPC procedure, the OLPC loops are performed n number of times to produce and maintain n SIR set-points denoted as S1, S2 . . . Sn. Then a higher or maximum one of the set-points (e.g., S1, S2 . . . Sn) can be selected as the set-point to be used for the ILPC at block 906. Because the higher or maximum SIR set-point among all the set-points is selected for the ILPC, it can be ensured that the achieved BLER at each of the n decoding attempts will not exceed the desired target BLER for each of the attempts.

In various embodiments, the OLPC loops performed for maintaining the SIR set-point of each decoding attempt may be of the same or different type/configuration. In one example, the final OLPC loop (e.g., the n-th OLPC of block 908) may have an anti-wind up mechanism. In some examples, the SIR set-point up/down step size of different OLPC loops may be different. The OLPC may be performed according to any suitable algorithm that produces an SIR set-point to target a desired BLER value, without necessarily restricted to conventional or generally known OLPC algorithms that use up/down adjustments in response to successful/failed decoding attempts. In some examples, the MP-OLPC procedure 900 may be performed for a sub-set (i.e., not all attempts) of the decoding attempts. For example, the MP-OLPC procedure 900 may be performed for a target decoding attempt (i.e., an early decoding attempt) and a final decoding attempt.

Figure 10:
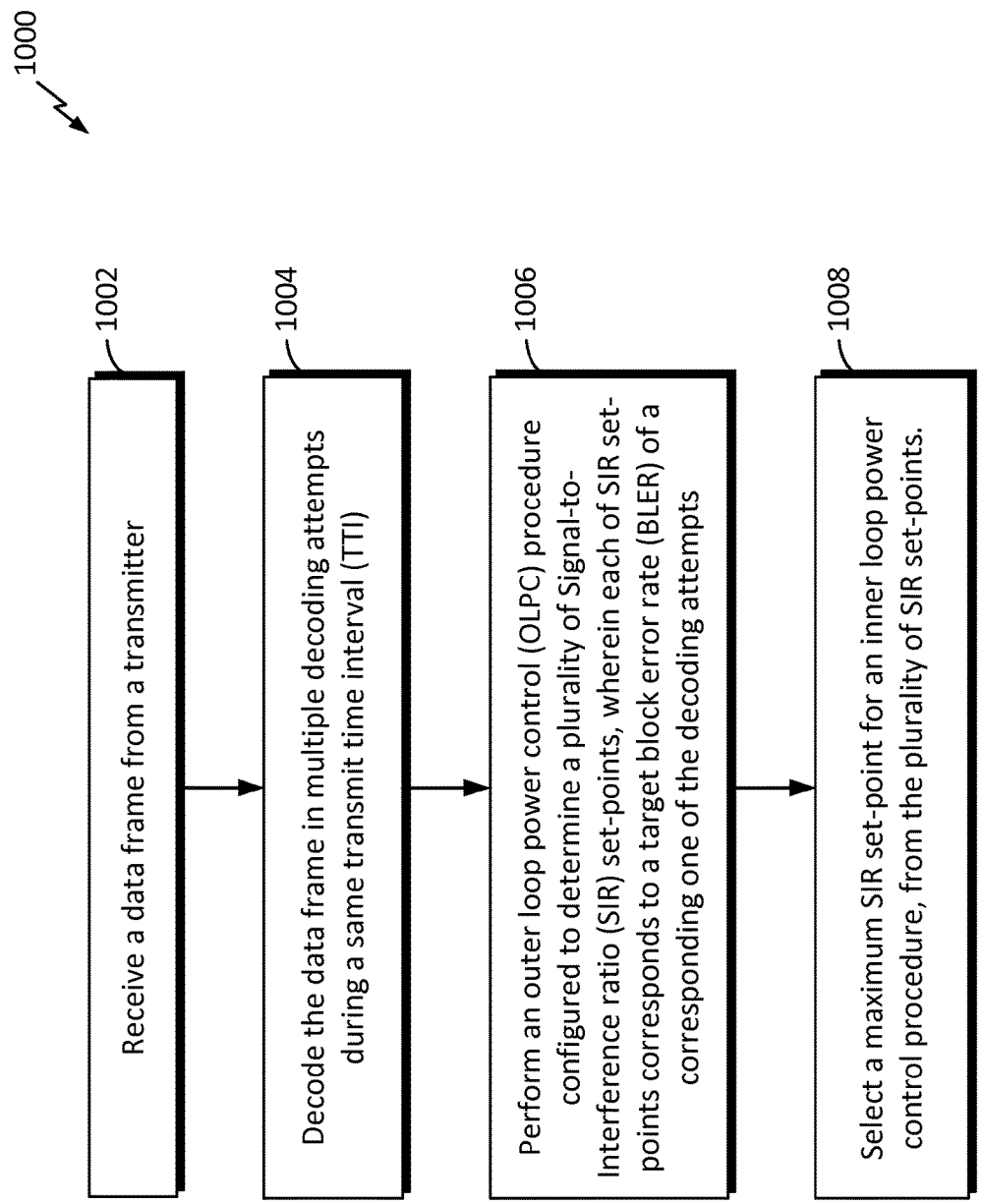
FIG. 10 is a flowchart illustrating a data frame decoding method utilizing multi-point OLPC in accordance with an aspect of the disclosure.

FIG. 10 is a flowchart illustrating a data frame decoding method 1000 utilizing MP-OLPC according to aspects of the disclosure. In some examples, the method 1000 may be performed by any of the UEs, Node Bs, and/or RNC of FIGS. 1, 2, 4, and/or 8, or any suitable wireless receiver. In one particular example, the method 1000 may be performed by the apparatus 800 of FIG. 8 that supports early frame termination. At block 1002, the apparatus 800 may utilize the transceiver 810 to receive a data frame from a transmitter. In one example, the apparatus may receive a data frame in a DPDCH 702 (see FIG. 7). At block 1004, the apparatus may utilize the frame decoding block 834 to decode the data frame in multiple (2 or more) decoding attempts during a same TTI. At block 1006, the apparatus may utilize the MP-OLPC 824 block to perform an OLPC procedure to determine a number of SIR set-points 836. Each of SIR set-points corresponds to a target BLER (e.g., BLER 838) specific to a corresponding one of the decoding attempts. In one example, the OLPC procedure may be the same as the MP-OLPC procedure 900 of FIG. 9. At block 1008, the apparatus may utilize the ILPC block 830 to select a higher or maximum SIR set-point for an ILPC procedure, from the plurality of SIR set-points. In one example, the ILPC procedure may be the ILPC 500 illustrated in FIG. 5. If the data frame is successfully decoded before performing all of the plurality of decoding attempts, the apparatus signals the transmitter to terminate transmission of the data frame (i.e., early frame termination).

Multi-Step Outer Loop Power Control

Figure 11:
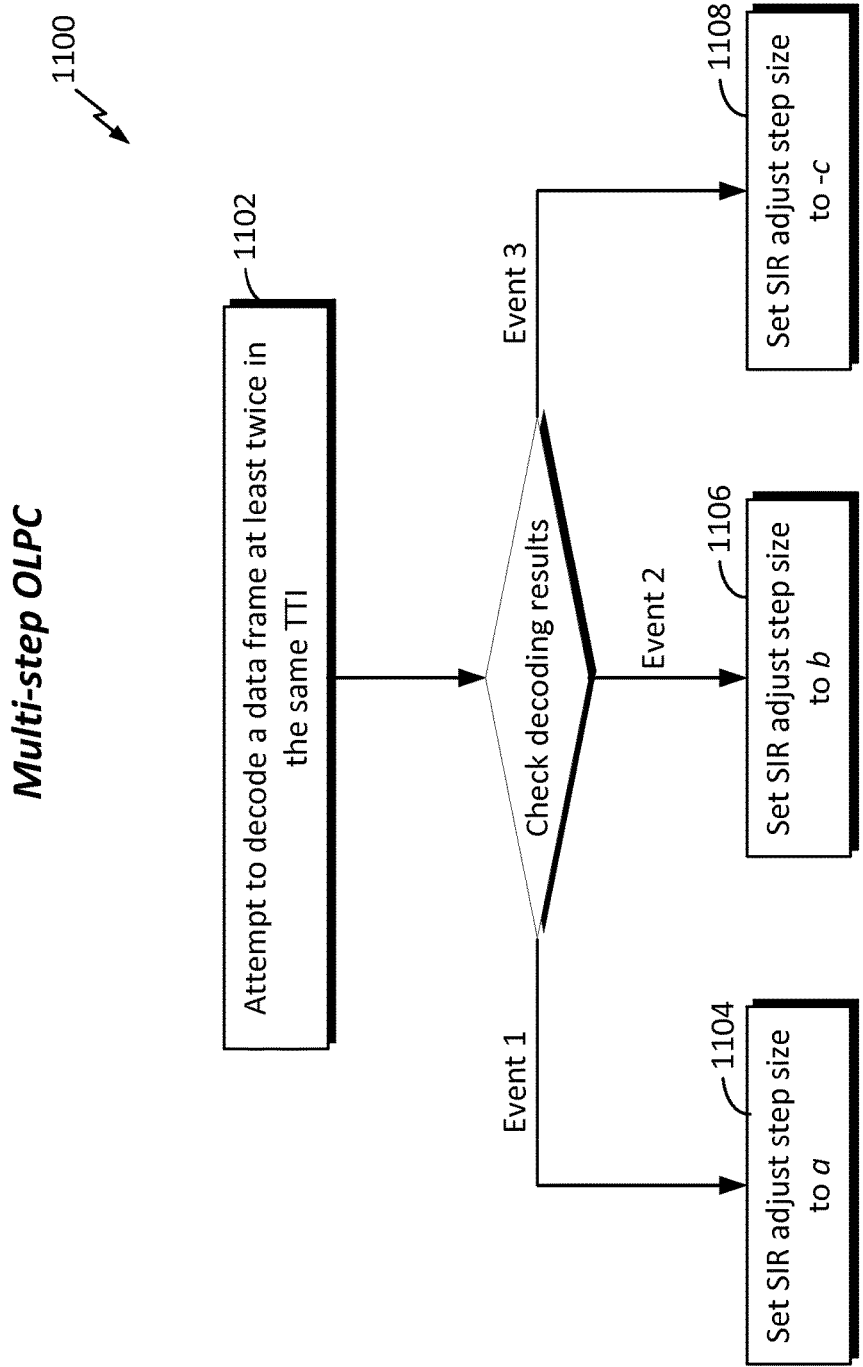
FIG. 11 is a flowchart illustrating a multi-step OLPC algorithm in accordance with aspects of the disclosure.

Some aspects of the disclosure provide a multi-step outer loop power control (MS-OLPC) algorithm that can facilitate frame early termination using different SIR adjustment step sizes in response to different decoding error events while achieving the desired BLER for the decoded data frame. FIG. 11 is a flowchart illustrating a MS-OLPC algorithm 1100 in accordance with aspects of the disclosure. The MS-OLPC algorithm 1100 may be performed by any of the UEs, Node Bs, and/or RNCs illustrated in FIGS. 1, 2, 4, and/or 8, or any suitable wireless receiver. At block 1102, it is assumed that a receiver attempts to decode a data frame at least twice (e.g., attempts A and B) in the same TTI. For example, in a 20 ms TTI, the attempts may be made at 10 ms and 20 ms. In a non-limiting example, in table 2 below, the adjustment step sizes by which a single SIR set-point is adjusted are shown in the rightmost column. For each decoding result, the MS-OLPC procedure may adjust the single target SIR set-point by a different step size, denoted by a, b, and −c in table 2. At block 1104, the MS-OLPC algorithm 1100 sets the SIR adjustment step size to a when both decoding attempts A and B fail (Event 1). At block 1106, the MS-OLPC algorithm 1100 sets the SIR adjustment step size to b when decoding attempt A fails while decoding attempt B passes (Event 2). At block 1108, the MS-OLPC algorithm 1100 sets the SIR adjustment step size to −c when both decoding attempts A and B pass (Event 3, all-passed decoding attempts).

In one example, the step sizes a and b are up adjustment (i.e., increase SIR set-point), and the step size −c is down adjustment (i.e., decrease SIR set-point). By setting the ratios between the different step sizes (e.g., step sizes a, b, and c), different BLER targets at different decoding attempts may be used.

TABLE 2

| Decoding status at first attempt A | Decoding status at second attempt B | Final SIR set-point adjustment | Number of event occurrence | SIR adjustment step size |
|---|---|---|---|---|
| Fail | Fail | UP | N1 | a |
| Fail | Pass | UP | N2 | b |
| Pass | Pass | Down | N3 | −c |

In one aspect of the disclosure, by setting a=1 dB, b=1/10 dB, and c=1/99 dB, it can be ensured that the BLER at the first attempt A is less than 11.1%, and the BLER at the second attempt B is less than 1.01%. The reason can be described as follows. Let N1, N2, N3 denote the number of occurrences of each event in Table 2. The first event (when both attempts A and B fail) occurs N1 number of times. The second event (attempt A fails while attempt B passes) occurs N2 number of times. The third event (both attempts A and B pass) occurs N3 number of times. In the long run, the single SIR set-point may be given by $$S = N1 + \frac{N2}{10} - \frac{N3}{99},$$

where S is the long term SIR set-point. Therefore, for large values of N1, N2 and N3, the MS-OLPC algorithm can ensure:

$$\frac{N1}{(N2+N3)} < \frac{N1}{N3} < \frac{1}{99},$$

which ensures that the BLER at the second attempt B (e.g., 20 ms) is less than 1.01%. Also, it can be shown that $$\frac{N2}{N3} < \frac{10}{99},$$

so the result is $$\frac{(N1+N2)}{N3} < \frac{11}{99},$$

which ensures the BLER at attempt A is less than 11.1%. In other words, the long term SIR set-point may be determined based on the adjustments made per decoding result.

In other aspects of the disclosure, the above-described MS-OLPC algorithm 1100 can be extended to cases involving more than two decoding attempts. By having a different step size for each possible set of decoding outcomes or events for all decoding attempts, the MS-OLPC algorithm 1100 can maintain a single SIR set-point that causes the BLER to have different values at different decoding attempts. Therefore, the BLER values achieved over different decoding attempts depend on the ratios of step sizes applied for each decoding set of outcomes.

Figure 12:
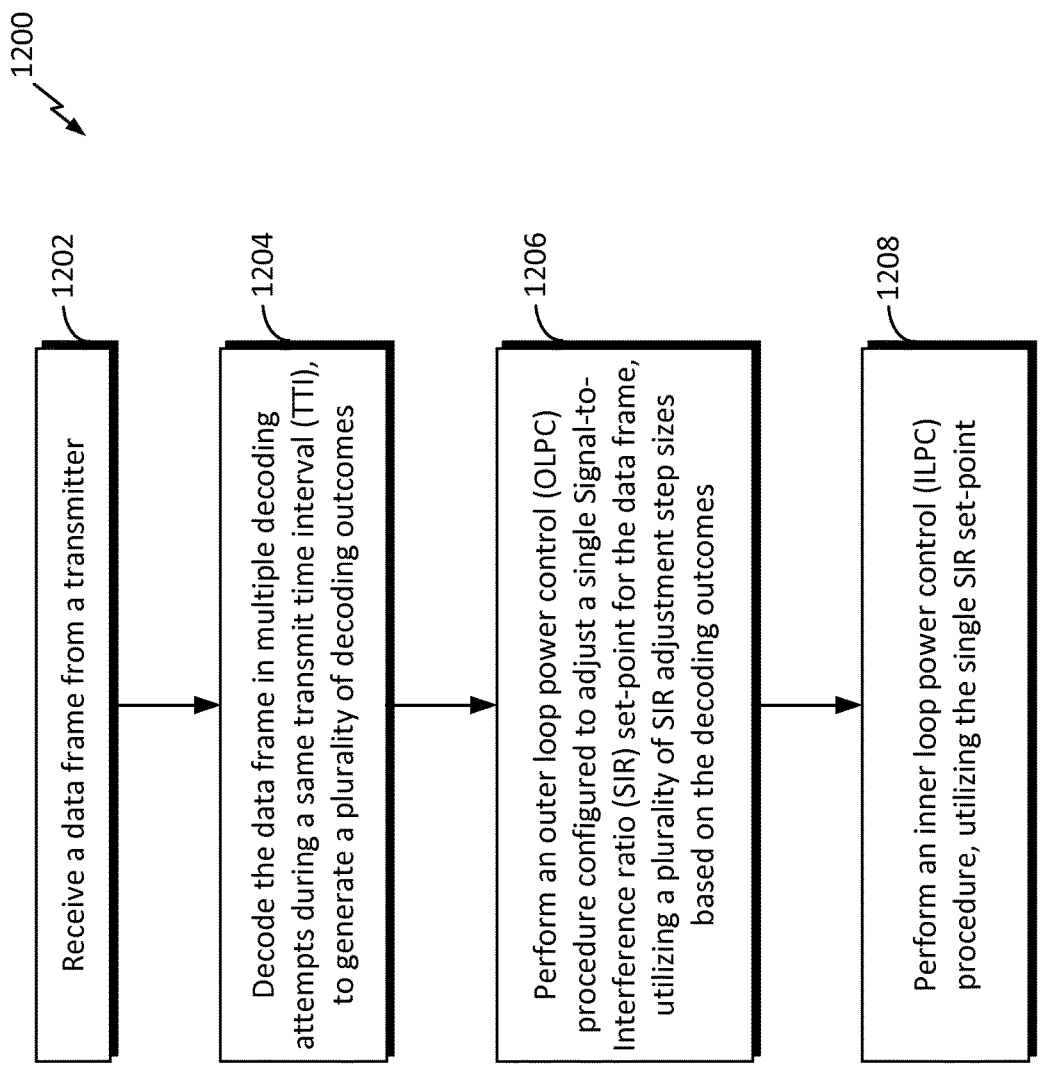
FIG. 12 is a flowchart illustrating a data frame decoding method multi-step OLPC in accordance with an aspect of the disclosure.

FIG. 12 is a flowchart illustrating a data frame decoding method 1200 utilizing MS-OLPC in accordance with an aspect of the disclosure. In some examples, the method 1200 may be performed by any of the UEs, Node Bs, and/or RNC of FIGS. 1, 2, 4, and/or 8, or any suitable wireless receiver. In one particular example, the method 1200 may be performed by the apparatus 800 of FIG. 8 that supports early frame termination. At block 1202, the apparatus receives a data frame from a transmitter. In one example, the apparatus may receive a data frame in a DPDCH (see FIG. 7). At block 1204, the apparatus may utilize the frame decoding block 834 to decode the data frame in multiple decoding attempts during a same TTI, to generate a plurality of decoding outcomes. For example, the outcomes may be the decoding outcomes or events shown in table 2 above. At block 1206, the apparatus may utilize the MS-OLPC blocks 822 to perform a MS-OLPC procedure configured to adjust a single SIR set-point 836 for the data frame, utilizing a plurality of SIR adjustment step sizes based on the decoding outcomes. In one example, the MS-OLPC algorithm 1100 of FIG. 11 may be utilized in block 1206. Here, the target BLER 838 for each decoding attempt may be controlled by a ratio of the SIR adjustment step sizes (e.g., step sizes a, b, and -c shown in table 2). At block 1208, the apparatus may utilize the ILPC block 830 to perform an ILPC procedure utilizing the single SIR set-point determined by the MS-OLPC. In one example, the ILPC procedure may be the ILPC 500 of FIG. 5. If the data frame is successfully decoded before performing all of the plurality of decoding attempts, the apparatus signals the transmitter to terminate transmission of the data frame (i.e., early frame termination).

Selecting the Step Size in Multi-step OLPC

As described in the above MS-OLPC algorithm, the ratio of SIR adjustment step sizes controls the BLER target at different decoding attempts in the MS-OLPC algorithm. An aspect of the disclosure provides a general method to determine suitable SIR adjustment step sizes to achieve the desired BLER targets.

In one example, table 3 lists some potential decoding results (events or outcomes) for n number of decoding attempts. Each row corresponds to one decoding event or outcome. In table 3, if the decoding result in an attempt i is successful, then the decoding results in all subsequent attempts (i.e., i+1, i+2 and so on) are also successful because the packet was already successfully decoded earlier. The first n events in table 3 are associated with up (increase) steps U (i=1, 2 . . . , n−1, n), where at least one attempt fails in each event (per row). In the final event (last row), all attempts (i.e., attempts 1 to n) pass, and thus the step size for this all-passed event is a down (decrease) step −D. In this table, $f_i$ (i=1, 2 . . . n) denotes the probability (or frequency) of occurrence of the first n events, and p denotes the probability (or frequency) of the final all-passed event.

TABLE 3

| Attempt 1 | Attempt 2 | ... | Attempt n − 1 | Attempt n | Step Size | Frequency |
|---|---|---|---|---|---|---|
| Fail | Fail | ... | Fail | Fail | $U_1$ | $f_1$ |
| Fail | Fail | ... | Fail | Pass | $U_2$ | $f_2$ |
| Fail | Fail | ... | Pass | Pass | $U_3$ | $f_3$ |
| . | . | . | . | . | . | . |
| . | . | . | . | . | . | . |
| . | . | . | . | . | . | . |
| Fail | Pass | ... | Pass | Pass | $U_n$ | $f_n$ |
| Pass | Pass | ... | Pass | Pass | −D | p |

By reaching stability (steady-state) of the OLPC, the following equation (1) can be shown.

$$\Sigma f_i U_i = pD \tag{1}$$

Then, the following equation (2) can be shown.

$$f_i \leq \frac{D_p}{U_i} \leq \frac{D}{U_i} \tag{2}$$

Given $p \leq 1$, because decoding attempt K (K=1, 2 ... n) fails in all events i=1, 2 ... n+1-K, the failure rate of attempt K is given by equation (3) below.

$$BLER_k = \sum_{i=1,\cdots,n-K+1} f_i$$

Thus, the following equation (4) can be shown.

$$BLER_k \leq \sum_{i=1,\cdots,n-K+1} \frac{D}{U_i}.$$

Therefore, by controlling the ratios of down step D and up step sizes $U_i$, the BLER target at different decoding attempts can be controlled.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for decoding a data frame in wireless communication, comprising:
   receiving a data frame from a transmitter in a channel;
   performing frame early termination by decoding the data frame in a plurality of decoding attempts during a same transmit time interval (TTI), wherein the performing frame early termination comprises:
      decoding the data frame at a first decoding attempt of the plurality of decoding attempts; and
      in response to determining that the first decoding attempt is not successful, decoding the data frame at a second decoding attempt of the plurality of decoding attempts;
   setting different block error rate (BLER) targets for the plurality of decoding attempts including the first decoding attempt and second decoding attempt for frame early termination;
   performing an outer loop power control (OLPC) procedure configured to determine a plurality of signal-to-interference ratio (SIR) set-points, wherein each of the plurality of SIR set-points corresponds to the BLER target of a corresponding one of the decoding attempts; and
   selecting a maximum SIR set-point for an inner loop power control (ILPC) procedure, from the plurality of SIR set-points.

2. The method of claim 1, wherein the performing frame early termination comprises:
   if the data frame is successfully decoded before performing all of the plurality of decoding attempts, signaling the transmitter to terminate transmission of the data frame.

3. The method of claim 1, wherein the performing the OLPC procedure comprises performing the OLPC procedure for only a sub-set of the decoding attempts.

4. The method of claim 3, wherein the performing the OLPC procedure comprises performing the OLPC procedure for the first decoding attempt and a final decoding attempt, among the plurality of decoding attempts.

5. The method of claim 1, wherein performing the OLPC procedure comprises performing the OLPC procedure in accordance with a same OLPC algorithm for two or more of the plurality of decoding attempts.

6. The method of claim 1, wherein performing the OLPC procedure comprises:
   performing the OLPC procedure in accordance with a first OLPC algorithm for the first decoding attempt; and
   performing the OLPC procedure in accordance with a second OLPC algorithm for the second decoding attempt, wherein the first OLPC algorithm is different from the second OLPC algorithm.

7. The method of claim 1,
wherein performing the OLPC procedure comprises:
determining a quality of a transmission comprising the data frame; and
determining the SIR set-point based on the quality of the transmission;
wherein performing the ILPC procedure comprises:
estimating an SIR of the transmission; and
sending one or more transmit power control commands to the transmitter based on a comparison between the estimated SIR and the maximum SIR set-point.

8. A method for decoding a data frame in wireless communication, comprising
receiving a data frame from a transmitter in a channel;
performing frame early termination by decoding the data frame in a plurality of decoding attempts during a same transmit time interval (TTI), to generate a plurality of decoding outcomes, wherein the performing frame early termination comprises:
decoding the data frame at a first decoding attempt of the plurality of decoding attempts; and
in response to determining that the first decoding attempt is not successful, decoding the data frame at a second decoding attempt of the plurality of decoding attempts;
performing an outer loop power control (OLPC) procedure configured to adjust a single signal-to-interference ratio (SIR) set-point for the data frame, using a plurality of SIR adjustment step sizes based on the decoding outcomes of the same data frame;
setting different block error rate (BLER) targets for the plurality of decoding attempts for frame early termination, based on a ratio of the SIR adjustment step sizes; and
performing an inner loop power control (ILPC) procedure, utilizing the single SIR set-point.

9. The method of claim 8, wherein the performing frame early termination comprises:
if the data frame is successfully decoded before performing all of the plurality of decoding attempts, signaling the transmitter to terminate transmission of the data frame.

10. The method of claim 8, wherein the ratio comprises a ratio of a down step size and an up step size of the SIR adjustment step sizes.

11. The method of claim 8,
wherein the plurality of SIR adjustment step sizes comprise a plurality of up step sizes and a down step size, and
wherein the performing the OLPC procedure comprises:
utilizing the down step size for a decoding outcome comprising all-passed decoding attempts; and
utilizing the plurality of up step sizes for decoding outcomes comprising at least one failed decoding attempt.

12. The method of claim 11, wherein the plurality of up step sizes and the down step size satisfies the following equation:

$$\sum_i f_i U_i = pD,$$

where $f_i$ (i=1, 2 ... n) denotes a probability of occurrence of the decoding outcome i including successful and failed decoding attempts, $U_i$ denotes the up step size for the decoding outcome i, p is a probability of occurrence of the decoding outcome including all-passed decoding attempts, and D denotes the down step size.

13. The method of claim 8,
wherein performing the OLPC procedure comprises:
determining a quality of a transmission comprising the data frame; and
determining the single SIR set-point based on the quality of the transmission;
wherein performing the ILPC procedure comprises:
estimating an SIR of the transmission; and
sending one or more transmit power control commands to the transmitter based on a comparison between the estimated SIR and the single SIR set-point.

14. An apparatus for wireless communication, comprising:
a transceiver configured to receive a data frame from a transmitter in a channel;
a computer-readable medium comprising a power control code; and
at least one processor coupled to the transceiver and configured by the power control code to:
perform frame early termination by decoding the data frame in a plurality of decoding attempts during a same transmit time interval (TTI), wherein the frame early termination comprises:
decoding the data frame at a first decoding attempt of the plurality of decoding attempts; and
in response to determining that the first decoding attempt is not successful, decoding the data frame at a second decoding attempt of the plurality of decoding attempts;
set different block error rate (BLER) targets for the plurality of decoding attempts for frame early termination;
perform an outer loop power control (OLPC) procedure to determine a plurality of signal-to-interference ratio (SIR) set-points, wherein each of the plurality of SIR set-points corresponds to the BLER target of a corresponding one of the decoding attempts; and
select a maximum SIR set-point for an inner loop power control (ILPC) procedure, from the plurality of SIR set-points.

15. The apparatus of claim 14, wherein, for frame early termination, the at least one processor is further configured to:
if the data frame is successfully decoded before performing all of the plurality of decoding attempts, signal the transmitter to terminate transmission of the data frame.

16. The apparatus of claim 14, wherein the at least one processor is further configured to perform the OLPC procedure for only a sub-set of the decoding attempts.

17. The apparatus of claim 16, wherein the at least one processor is further configured to perform the OLPC procedure for the first decoding attempt and a final decoding attempt, among the plurality of decoding attempts.

18. The apparatus of claim 14, wherein the at least one processor is further configured to perform the OLPC procedure in accordance with a same OLPC algorithm for two or more of the plurality of decoding attempts.

19. The apparatus of claim 14, wherein the at least one processor is further configured to:
perform the OLPC procedure in accordance with a first OLPC algorithm for the first decoding attempt; and perform the OLPC procedure in accordance with a second OLPC algorithm for the second decoding attempt,
wherein the first OLPC algorithm is different from the second OLPC algorithm.

20. The apparatus of claim 14,
wherein, for the OLPC procedure, the at least one processor is further configured to:
determine a quality of a transmission comprising the data frame; and
determine the SIR set-point based on the quality of the transmission;
wherein for the ILPC procedure, the at least one processor is further configured to:
estimate an SIR of the transmission; and
send one or more transmit power control commands to the transmitter based on a comparison between the estimated SIR and the maximum SIR set-point.

21. An apparatus for wireless communication, comprising:
a transceiver configured to receive a data frame from a transmitter in a channel;
a computer-readable medium comprising a power control code; and
at least one processor coupled to the transceiver and configured by the power control code to:
perform frame early termination by decoding the data frame in a plurality of decoding attempts during a same transmit time interval (TTI), to generate a plurality of decoding outcomes, wherein the frame early termination comprises:
decoding the data frame at a first decoding attempt of the plurality of decoding attempts; and
in response to determining that the first decoding attempt is not successful, decoding the data frame at a second decoding attempt of the plurality of decoding attempts;
perform an outer loop power control (OLPC) procedure to adjust a single signal-to-interference ratio (SIR) set-point for the data frame, using a plurality of SIR adjustment step sizes based on the decoding outcomes of the same data frame;
set different block error rate (BLER) targets for the plurality of decoding attempts for frame early termination, based on a ratio of the SIR adjustment step sizes; and
perform an inner loop power control (ILPC) procedure, utilizing the single SIR set-point.

22. The apparatus of claim 21, wherein, for frame early termination, the at least one processor is further configured to:
if the data frame is successfully decoded before performing all of the plurality of decoding attempts, signal the transmitter to terminate transmission of the data frame.

23. The apparatus of claim 21, wherein the ratio comprises a ratio of a down step size and an up step size of the SIR adjustment step sizes.

24. The apparatus of claim 21,
wherein the plurality of SIR adjustment step sizes comprise a plurality of up step sizes and a down step size, and
wherein the OLPC procedure comprises:
utilizing the down step size for a decoding outcome comprising all-passed decoding attempts; and
utilizing the plurality of up step sizes for decoding outcomes comprising at least one failed decoding attempt.

25. The apparatus of claim 24, wherein the plurality of up step sizes and the down step size satisfy the following equation:

$$\sum_i f_i U_i = pD,$$

where $f_i$ (i=1, 2 ... n) denotes a probability of occurrence of the decoding outcome i including successful and failed decoding attempts, $U_i$ denotes the up step size for the decoding outcome i, p is a probability of occurrence of the decoding outcome including all-passed decoding attempts, and D denotes the down step size.

26. The apparatus of claim 21,
wherein, for the OLPC procedure, the at least one processor is further configured to:
determine a quality of a transmission comprising the data frame; and
determine the single SIR set-point based on the quality of the transmission;
wherein, for the ILPC procedure, the at least one processor is further configured to:
estimate an SIR of the transmission; and
send one or more transmit power control commands to the transmitter based on a comparison between the estimated SIR and the single SIR set-point.

* * * * *